(12) United States Patent
Lin

(10) Patent No.: US 10,635,828 B2
(45) Date of Patent: Apr. 28, 2020

(54) TOKENIZED LINKS WITH GRANULAR PERMISSIONS

(71) Applicant: Microsoft Technology Licensing, LLC., Redmond, WA (US)

(72) Inventor: Eugene Seichi Lin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 354 days.

(21) Appl. No.: 15/274,367

(22) Filed: Sep. 23, 2016

(65) Prior Publication Data

US 2018/0089451 A1 Mar. 29, 2018

(51) Int. Cl.
*H04L 29/06* (2006.01)
*G06F 21/62* (2013.01)

(52) U.S. Cl.
CPC ...... *G06F 21/6209* (2013.01); *G06F 21/6254* (2013.01); *H04L 63/10* (2013.01); *H04L 63/102* (2013.01); *H04L 63/107* (2013.01); *H04L 63/108* (2013.01)

(58) Field of Classification Search
CPC . G06F 21/6209; G06F 21/6254; H04L 63/10; H04L 63/102; H04L 63/107; H04L 63/108
USPC .......................................................... 726/28
See application file for complete search history.

(56) References Cited

U.S. PATENT DOCUMENTS

| | | | |
|---|---|---|---|
| 5,297,032 A | 3/1994 | Trojan et al. | |
| 5,321,750 A | 6/1994 | Nadan | |
| 5,339,392 A | 8/1994 | Risberg et al. | |
| 5,432,932 A | 7/1995 | Chen et al. | |
| 5,819,284 A | 10/1998 | Farber et al. | |
| 5,959,621 A | 9/1999 | Nawaz et al. | |
| 6,026,474 A | 2/2000 | Carter et al. | |
| 6,188,405 B1 | 2/2001 | Czerwinski et al. | |
| 6,216,141 B1 | 4/2001 | Straub et al. | |

(Continued)

FOREIGN PATENT DOCUMENTS

| | | |
|---|---|---|
| WO | 9926127 A1 | 5/1999 |
| WO | 2011102825 A1 | 8/2011 |

OTHER PUBLICATIONS

"Digi-Data LeapDrive Service", Internet Storage Services Opportunity, Published by Digi-Data Corporation, Sep. 10, 2008, pp. 1-14.

(Continued)

*Primary Examiner* — Jahangir Kabir
(74) *Attorney, Agent, or Firm* — Merchant & Gould

(57) ABSTRACT

Systems and methods for generating and handling tokenized links pointing to web-accessible files are provided herein. The tokenized link obscures the filepath of the file and is associated with a permission scope that consists of a set of criteria for evaluating conditions for access to the file. The link may be freely shared and still provide access restrictions within a domain to the linked file without needing to modify the permissions for the file itself. A user with access to the file may thus freely share the link with other users, who may in turn share the link with yet other users, and be assured that only authorized users will gain access to the file. The tokenized links thereby improve the security of the files, the user experience of the distributing and receiving users, and the functionality of the devices using the tokenized links.

17 Claims, 8 Drawing Sheets

(56) References Cited

U.S. PATENT DOCUMENTS

| | | | |
|---|---|---|---|
| 6,243,676 B1 | 6/2001 | Witteman | |
| 6,278,448 B1 | 8/2001 | Brown et al. | |
| 6,311,058 B1 | 10/2001 | Wecker et al. | |
| 6,314,425 B1* | 11/2001 | Serbinis | G06F 17/3089 |
| 6,360,254 B1 | 3/2002 | Linden et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,724,403 B1 | 4/2004 | Santoro et al. | |
| 6,807,558 B1 | 10/2004 | Hassett et al. | |
| 6,832,355 B1 | 12/2004 | Duperrouzel et al. | |
| 6,976,210 B1 | 12/2005 | Silva et al. | |
| 7,028,264 B2 | 4/2006 | Santoro et al. | |
| 7,054,905 B1 | 5/2006 | Hanna et al. | |
| 7,143,066 B2* | 11/2006 | Shear | G06Q 20/3674 |
| | | | 705/54 |
| 7,272,639 B1 | 9/2007 | Levergood et al. | |
| 7,376,907 B2 | 5/2008 | Santoro et al. | |
| 7,512,607 B2 | 3/2009 | Nagano et al. | |
| 7,536,713 B1 | 5/2009 | Bartholomew | |
| 7,814,172 B2 | 10/2010 | Martin et al. | |
| 7,933,632 B2 | 4/2011 | Flynt et al. | |
| 7,987,431 B2 | 7/2011 | Santoro et al. | |
| 7,996,566 B1 | 8/2011 | Sylvain et al. | |
| 8,032,930 B2 | 10/2011 | Hicks | |
| 8,346,966 B1 | 1/2013 | Phatak et al. | |
| 8,364,951 B2* | 1/2013 | Peterka | H04L 63/062 |
| | | | 380/279 |
| 8,544,069 B1* | 9/2013 | Subbiah | G06F 21/41 |
| | | | 726/4 |
| 8,572,712 B2 | 10/2013 | Rice et al. | |
| 8,584,258 B2 | 11/2013 | La Rotonda et al. | |
| 8,611,544 B1 | 12/2013 | Herbach et al. | |
| 8,955,084 B2 | 2/2015 | Do et al. | |
| 9,087,208 B2 | 7/2015 | Ibel et al. | |
| 9,547,665 B2 | 1/2017 | Wood et al. | |
| 2002/0038425 A1* | 3/2002 | Kanno | G06Q 40/04 |
| | | | 713/185 |
| 2003/0079136 A1 | 4/2003 | Ericta et al. | |
| 2003/0110131 A1 | 6/2003 | Alain et al. | |
| 2003/0196087 A1 | 10/2003 | Stringer et al. | |
| 2004/0054628 A1* | 3/2004 | de Jong | H04L 29/06027 |
| | | | 705/51 |
| 2004/0257610 A1* | 12/2004 | Itoh | H04L 29/06 |
| | | | 358/1.15 |
| 2005/0005133 A1 | 1/2005 | Xia et al. | |
| 2005/0251411 A1 | 11/2005 | Ishii et al. | |
| 2005/0278259 A1* | 12/2005 | Gunaseelan | G06F 21/10 |
| | | | 705/59 |
| 2006/0080103 A1 | 4/2006 | Van Breemen | |
| 2006/0184673 A1 | 8/2006 | Liebman | |
| 2006/0190833 A1 | 8/2006 | Sangiovanni et al. | |
| 2006/0259601 A1 | 11/2006 | Soelberg et al. | |
| 2006/0286536 A1 | 12/2006 | Mohler et al. | |
| 2007/0033637 A1* | 2/2007 | Yami | H04L 63/0428 |
| | | | 726/2 |
| 2007/0039055 A1 | 2/2007 | Plastina et al. | |
| 2007/0130177 A1 | 6/2007 | Schneider et al. | |
| 2007/0168490 A1 | 7/2007 | Kent et al. | |
| 2007/0214482 A1 | 9/2007 | Nguyen | |
| 2007/0234215 A1 | 10/2007 | Graham et al. | |
| 2007/0239668 A1 | 10/2007 | Shin et al. | |
| 2008/0020738 A1* | 1/2008 | Ho | H04L 63/18 |
| | | | 455/414.1 |
| 2008/0115227 A1 | 5/2008 | Toutonghi | |
| 2008/0120196 A1 | 5/2008 | Reed et al. | |
| 2008/0140664 A1 | 6/2008 | Hao et al. | |
| 2008/0140849 A1 | 6/2008 | Collazo | |
| 2008/0189617 A1 | 8/2008 | Covell et al. | |
| 2008/0229211 A1 | 9/2008 | Herberger et al. | |
| 2008/0262920 A1 | 10/2008 | O'neill et al. | |
| 2009/0083266 A1 | 3/2009 | Poola et al. | |
| 2009/0150947 A1 | 6/2009 | Soderstrom | |
| 2009/0187825 A1 | 7/2009 | Sandquist et al. | |
| 2009/0234876 A1 | 9/2009 | Schigel et al. | |
| 2009/0235347 A1* | 9/2009 | Syed | H04L 9/3213 |
| | | | 726/10 |
| 2009/0248794 A1 | 10/2009 | Helms et al. | |
| 2009/0282005 A1 | 11/2009 | Kim et al. | |
| 2009/0319376 A1 | 12/2009 | Mills | |
| 2010/0036967 A1 | 2/2010 | Caine et al. | |
| 2010/0192211 A1 | 7/2010 | Bono et al. | |
| 2010/0198730 A1* | 8/2010 | Ahmed | G06F 17/30528 |
| | | | 705/50 |
| 2010/0205221 A1 | 8/2010 | Shaw et al. | |
| 2010/0228989 A1 | 9/2010 | Neystadt et al. | |
| 2010/0281093 A1 | 11/2010 | Poder et al. | |
| 2010/0299601 A1 | 11/2010 | Kaplan et al. | |
| 2010/0302015 A1 | 12/2010 | Kipman et al. | |
| 2010/0318611 A1 | 12/2010 | Curtin et al. | |
| 2011/0078775 A1 | 3/2011 | Yan | |
| 2011/0125742 A1 | 5/2011 | Haines et al. | |
| 2011/0167036 A1 | 7/2011 | Liebman | |
| 2011/0173188 A1 | 7/2011 | Walsh et al. | |
| 2011/0173547 A1 | 7/2011 | Lewis et al. | |
| 2011/0202430 A1 | 8/2011 | Narayanan et al. | |
| 2011/0225547 A1 | 9/2011 | Fong et al. | |
| 2011/0269437 A1 | 11/2011 | Marusi et al. | |
| 2011/0302133 A1 | 12/2011 | Kuruganti et al. | |
| 2012/0005237 A1 | 1/2012 | Obata | |
| 2012/0102566 A1* | 4/2012 | Vrancken | G06F 21/335 |
| | | | 726/20 |
| 2012/0197419 A1 | 8/2012 | Dhruv et al. | |
| 2012/0204250 A1* | 8/2012 | Anderson | G06Q 10/107 |
| | | | 726/9 |
| 2012/0216296 A1* | 8/2012 | Kidron | G06F 17/30867 |
| | | | 726/28 |
| 2012/0317288 A1 | 12/2012 | Campana et al. | |
| 2012/0330736 A1* | 12/2012 | Beckner | G06Q 30/02 |
| | | | 705/14.16 |
| 2012/0331529 A1* | 12/2012 | Ibel | G06F 21/6218 |
| | | | 726/4 |
| 2013/0110832 A1 | 5/2013 | Wood et al. | |
| 2013/0110890 A1 | 5/2013 | Bailor | |
| 2013/0110892 A1 | 5/2013 | Wood et al. | |
| 2013/0191884 A1* | 7/2013 | Leicher | H04L 63/08 |
| | | | 726/4 |
| 2014/0137232 A1* | 5/2014 | Kobayashi | H04L 63/083 |
| | | | 726/17 |
| 2014/0223527 A1 | 8/2014 | Bortz et al. | |
| 2015/0143468 A1 | 5/2015 | Hebert et al. | |
| 2015/0150106 A1* | 5/2015 | Lund | H04L 63/08 |
| | | | 726/7 |
| 2015/0213443 A1* | 7/2015 | Geffon | G06Q 20/3821 |
| | | | 705/76 |
| 2015/0242597 A1* | 8/2015 | Danciu | G06F 21/10 |
| | | | 726/30 |
| 2015/0310188 A1* | 10/2015 | Ford | G06F 21/10 |
| | | | 726/28 |
| 2017/0140658 A1* | 5/2017 | Aluvala | G09B 5/02 |

OTHER PUBLICATIONS

"Enable Anonymous Access", Retrieved from <<https://support.office.com/en-us/article/enable-anonymous-access-3647cdd5-1ab8-48cf-b4ee-d1b652bbabdd?ocmassetID=HA010113018&CorrelationId=e06ccabb-2516-43c1-b0f8-7ef6d0c4a8c7&ui=en-US&rs=en-US&ad=US#BMenablelistlibrary?>>, Dec. 1, 2011, 3 Pages.

"One True Media", Retrieved from <<http://bcpslibraryinformationservices.pbworks.com/w/page/12773121/One%20True %20Media>>, Retrieved on: Dec. 5, 2011, 2 Pages.

"Sharing Users and Content Across Multiple Sites", Retrieved from <<https://www.drupal.org/node/201673>>, Mar. 19, 2010, 4 Pages.

"Non-Final Office Action Issued in U.S Appl. No. 13/282,595", dated Aug. 24, 2015, 23 Pages.

"Final Office Action Issued in U.S. Appl. No. 13/439,126", dated Jul. 8, 2016, 9 Pages.

"Non-Final Office Action Issued in U.S Appl. No. 13/439,126", dated Sep. 22, 2015, 8 Pages.

(56) References Cited

OTHER PUBLICATIONS

"Final Office Action Issued in U.S. Appl. No. 13/528,897", dated Nov. 8, 2016, 32 Pages.
"Final Office Action Issued in U.S. Appl. No. 13/528,897", dated Aug. 11, 2015, 32 Pages.
"Non-Final Office Action Issued in U.S Appl. No. 13/528,897", dated Mar. 25, 2015, 31 Pages.
"Non-Final Office Action Issued in U.S Appl. No. 13/528,897", dated Mar. 17, 2017, 36 Pages.
"Non-Final Office Action Issued in U.S. Appl. No. 13/528,897", dated Oct. 6, 2017, 32 Pages.
"Non-Final Office Action Issued in U.S. Appl. No. 13/528,897", dated Apr. 22, 2016, 32 Pages.
Sohn, et al., "Content Sharing Between Home Networks by Using Personal Information and Associated Fuzzy Vault Scheme", In IEEE Transactions on Consumer Electronics, vol. 55, Issue 2, May 2009, pp. 431-437.
Swift, Mike, "Blekko and Montage Let Users Make Web Search More Social", Retrieved from <<http://articles.latimes.com/2011/jan/01/business/la-fi-websearch-20110101>>, Jan. 1, 2011, 3 Pages.
"International Search Report and Written Opinion Issued in PCT Application No. PCT/US2017/051682", dated Nov. 22, 2017, 10 Pages.
Mackenzie, Neil, "Permissions in Azure DocumentDB", Published on: Dec. 9, 2014 Available at: https://blogs.msdn.microsoft.com/cloud_solution_architect/2014/12/09/permissions-in-azure-documentdb/.
"Offers and Actions", Retrieved on: Aug. 8, 2016 Available at: https://msdn.microsoft.com/en-us/library/cc287684.aspx.
Gommans, et al., "Token-based Authorization of Connection Oriented Network Resources", In Proceedings of 1st International Workshop on Networks for Grid Applications, Oct. 29, 2004, 8 pages.
Machulak, et al., "User-Managed Access to Web Resources", In Technical Report No. CS-TR-1196, Mar. 2010, 12 pages.
"Final Office Action Issued in U.S. Appl. No. 13/282,595", dated Feb. 11, 2016, 21 Pages.
"Final Office Action Issued in U.S. Appl. No. 13/282,595", dated Oct. 18, 2017, 16 Pages.
"Final Office Action Issued in U.S. Appl. No. 13/282,595", dated Jan. 30, 2014, 20 Pages.
"Non Final Office Action Issued in U.S. Appl. No. 13/282,595", dated Apr. 24, 2013, 19 Pages.
"Non Final Office Action Issued in U.S. Appl. No. 13/282,595", dated Mar. 6, 2017, 16 Pages.
"Final Office Action Issued in U.S. Appl. No. 13/439,126", dated Feb. 28, 2014, 12 Pages.
"Non Final Office Action Issued in U.S. Appl. No. 13/439,126", dated Jul. 19, 2013, 12 Pages.
"Final Office Action Issued in U.S. Appl. No. 13/528,897", dated Jun. 27, 2018, 33 Pages.
"First Office Action and Search Report Issued in Chinese Patent Application No. 201210419134.8", dated Nov. 25, 2014, 15 Pages.
"Second Office Action and Search Report Issued in Chinese Patent Application No. 201210419134.8", dated Jul. 1, 2015, 11 Pages.

\* cited by examiner

TOKENIZED LINKS WITH GRANULAR PERMISSIONS

BACKGROUND

When sharing a document among collaborators, users may either restrict access to the document itself or its filepath. Neither of these options provide for the flexible sharing and robust security that users desire. Restricting access to the document itself requires that a distributing user manually input the identities of authorized users (i.e., those users who are granted access to read or write to the document), but the document itself may still be visible (albeit not accessible) to unauthorized users. Providing a hidden filepath, in contrast, may prevent unauthorized users from coming across documents that are not accessible to them, but if a link is inadvertently shared, the security of the document will have been compromised. Alternatively, links may be limited in their accessibility to a domain, but a domain may include persons who are part of an organization, but lack the need-to-know, which will still require the document to be access restricted or the link to be not shared with those persons to maintain proper security within the domain.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods for providing tokenized links are provided herein. A link that is tokenized points to a document and is associated with a permission scope that consists of a set of criteria for evaluating conditions at the time the link is accessed (e.g., identity, group membership, device state, time/date) to determine whether the user is granted access to the linked document. The link may be freely shared and still provide access restrictions within a domain to the linked document without needing to modify the permissions for the document itself. A user with access to the document may thus freely share the link (e.g., via emails, Instant Messages, forum posts) with other users, who may in turn share the link with yet other users, and be assured that only authorized users will gain access to the document.

The computing device hosting the linked-to file, such as a document server, receives the request for a document that includes the token for the document from a device associated with a requesting user. The hosting device uses the token and the identity of the requesting user to determine whether the permission criteria set for the link are satisfied by the requesting user. In response to the permission criteria being satisfied, the document is provided to the requesting user, otherwise the hosting device may query the requesting user for additional identifying information or may deny the request for the document. By verifying permissions relative to the tokenized link, rather than the document itself, distributing users may create multiple sharing profiles for a single document that obscure the location and identity of the document itself to unauthorized parties, provide greater flexibility in sharing the documents, and may require a lower expenditure of processing resources to handle, thus improving the functionality of the computer devices involved.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
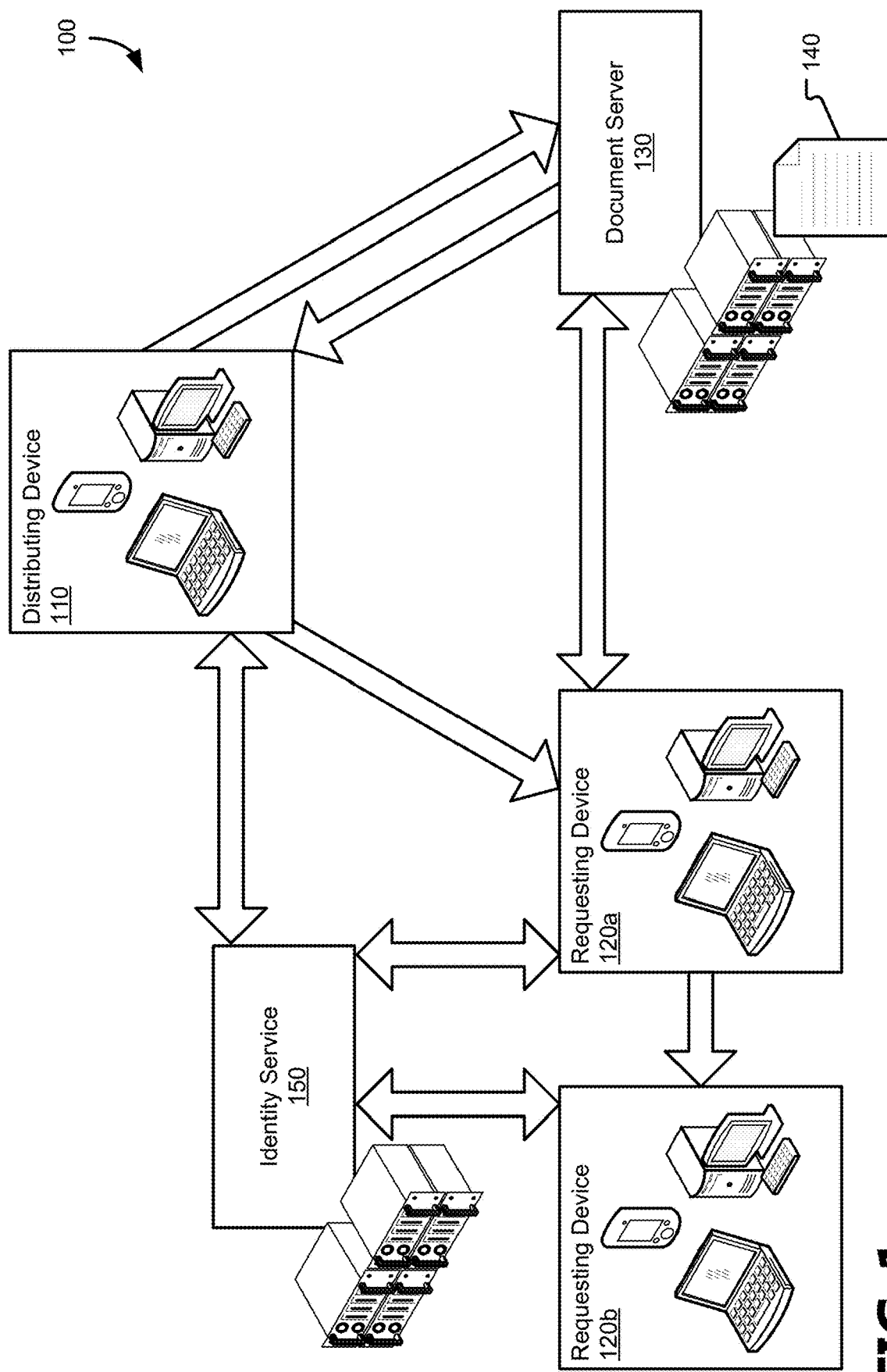
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems and methods for providing tokenized links are provided herein. A tokenized link points to a document and is associated with a permission scope that includes of a set of criteria for evaluating conditions at the time the link is accessed (e.g., identity, group membership, device state, time/date) to determine whether the user is granted access to the linked document. The link may be freely shared and still provide access restrictions within a domain to the linked document without modifying the permissions for the document itself. A user with access to the document may thus freely share the link (e.g., via emails, Instant Messages, forum posts) with other users, who may in turn share the link with yet other users, and be assured that only authorized users will gain access to the document.

The computing device hosting the linked-to file receives the request for a document that includes the token for the document from a device associated with a requesting user. The hosting device uses the token and the identity of the requesting user to determine whether the permission criteria set for the link are satisfied by the requesting user. In response to the permission criteria being satisfied, the document is provided to the requesting user, otherwise the hosting device may query the requesting user for additional identifying information or may deny the request for the document. By verifying permissions relative to the tokenized link, rather than the document itself, distributing users may create multiple sharing profiles for a single document that obscure the location and identity of the document itself to unauthorized parties, thereby providing greater flexibility in sharing the documents, and lowering the expenditure of processing resources to handle, thus improving the functionality of the computer devices involved.

FIG. 1 illustrates an example environment 100 in which the present disclosure may be practiced. As illustrated, a distributing device 110 is in communication with a first requesting device 120a (generally, requesting device 120), a document server 130 hosting at least one document 140, and an identity service 150. The first requesting device 120a is in communication with the distributing device 110, the document server 130, the identity service 150, and may be in communication with a second requesting device 120b, which in turn is in communication with the identity service 150, and may (or may not) be in communication with the distributing device 110 or the document server 130. As will be appreciated, the devices illustrated in FIG. 1 are provided as examples, and more or fewer of the identified devices may be present in various aspects.

The distributing device 110, the requesting device 120, document server 130, and identity service 150 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, 6B, and 7. Distributing device 110 and requesting devices 120 are operated by users, who may be humans or automated systems (e.g., "bots") that access and share document 140 stored on document servers 130. In various aspects, the distributing device 110, the requesting device 120, the document server 130, and the identity service 150 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

In various aspects, the document 140 for which the tokenized link is generated includes any type of computer readable file that the distributing user wishes to share over a network. Example file types for the document include, but are not limited to: word processing documents, spreadsheets, databases, presentations, canvas files, images, sound files, videos, archives, webpages, executables, libraries, binaries, computer aided design files, certificates, and portions thereof.

The distributing device 110 is used by a user (a distributing user) to request a tokenized link for a document 140 stored on the document server 130 which is then shared with one or more requesting device 120 to enable the user (a receiving or requesting user) of that device to request the document 140 via the tokenized link from the document server 130 or forward the tokenized link to one or more additional requesting devices 120 to allow those users to forward the tokenized link or request the document 140. In various aspects, the distributing device 110 may also be a requesting device 120, such as, for example, when the distributing user attempts to request the document 140 via the tokenized link.

In various aspects, the document server 130 is provided by the distributing device 110 or by a separate computing device. The document server 130 stores the documents 140 for which tokenized links are created. The tokenized link points to the document server 130 and includes a token that is interpretable by the document server 130 to retrieve the linked-to document 140 when the requesting user is authorized to access that document 140. In various aspects, the document server 130 provides a link tokenizer 200 (discussed in greater detail in regard to FIG. 2) to create the tokens used in the links and to interpret those tokens and identifying information for the requesting users against sharing criteria set by the distributing user before sharing the linked-to document 140 to the requesting devices 120.

The users of the distributing device 110 and each requesting device 120 are authenticated by one or more identity services 150. The identity service 150 is operable to allow the users to log into the distributing device 110 or requesting device 120 as well as third party services (e.g., an online email application, a social networking website, a Virtual Private Network (VPN)). A given user may log into multiple identity services 150 via a single device, which will provide various identities for the user. For example, a user may log into a personal device's operating system as "John Doe", and into an online email application as "DoeJohn2000@example.com"; the user is still the same person, but each identity service 150 may associate the user with different preferences, historical use data, and security settings. An identity service 150 logs the users into various systems by the use of a shared secret associated with a username and/or domain name, such as, for example, a password, a biometric marker, or an access token. When a user provides the shared secret held by the identity service 150, the user is logged into the identity service 150 will be provided with an authorization token to use the device, access files, or use a service that has its access controlled by the identity service 150.

In various aspects, an identity service 150 runs on a distributing device 110 or a requesting device 120, thus allowing local access to the devices when network connectivity is not available to a remote identity service 150. In additional aspects, an identity service 150 runs on the document server 130 or in a network environment hosting the document server 130. In yet other aspects, the identity service 150 is a third-party service running on a device that is not controlled by the distributing, requesting, or receiving users or the host of the document 140, which provides access control for one or more network environments or services.

Figure 2:
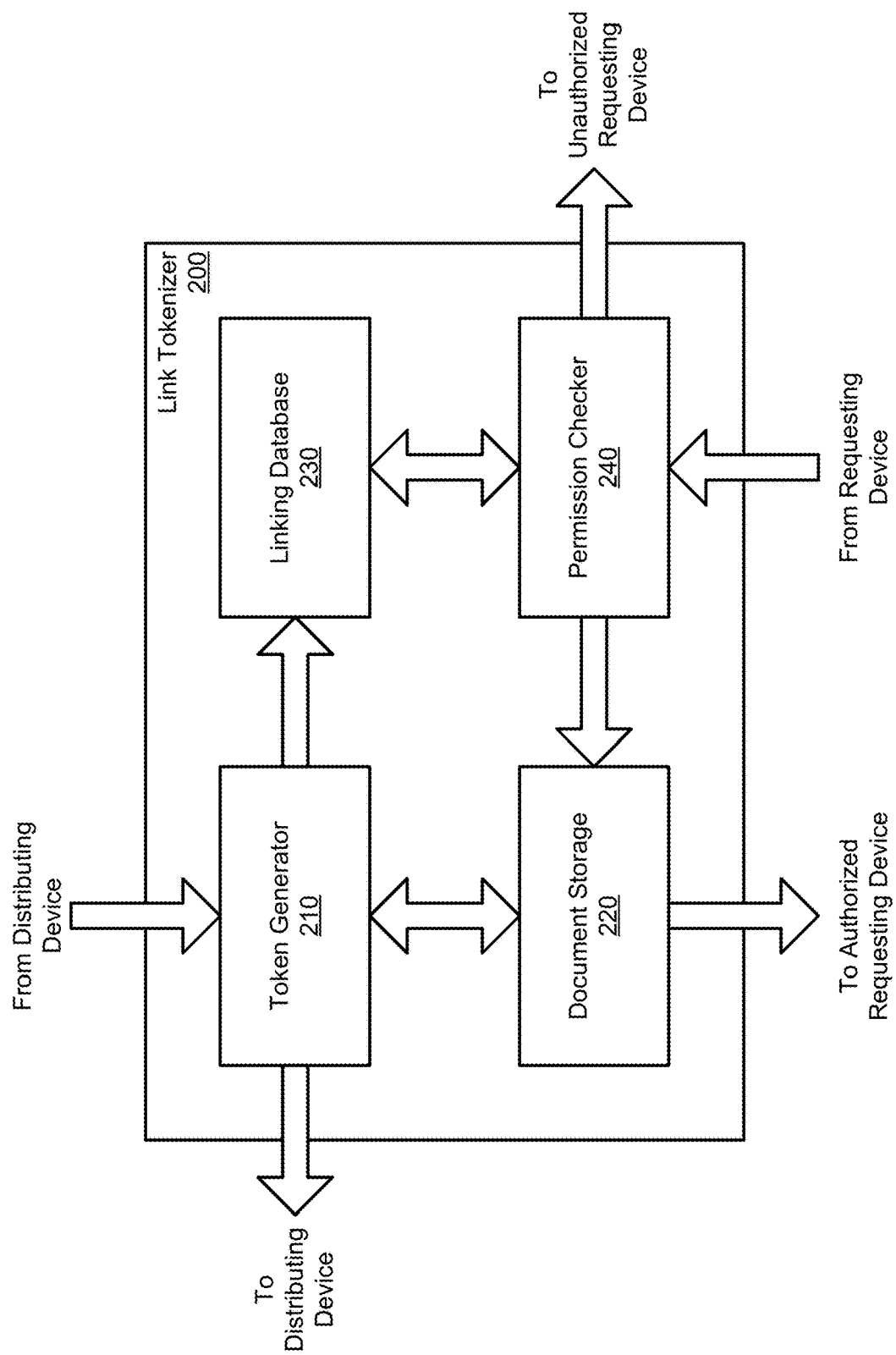
FIG. 2 is a block diagram of a link tokenizer.

FIG. 2 is a block diagram of a link tokenizer 200. In various aspects, the link tokenizer 200 is provided by the document server 130 or another device in communication with the document server 130 to create tokenized links and to control access to the documents 140 linked to by the tokenized links. The link tokenizer 200 provides or is in communication with: a token generator 210, operable to produce a token for a document 140 associated with permission criteria; a document storage 220, in which the document 140 is stored and from which the document 140 is accessible; a linking database 230, operable to store associations between token, the document 140, and the permission criteria; and a permission checker 240, operable to evaluate requests that include tokens to provide the document 140 to users who satisfy the permission criteria.

The token generator 210 is in communication with the distributing device 110, the document storage 220, and the linking database 230. The distributing device 110 communicates the document 140 for which a token is to be generated and the permission criteria to the token generator 210, which produces a token for the document 140 and transmits the token to the distributing device 110 for use in a tokenized link. The token generator 210 transmits the identity of the document and/or its filepath in the document storage 220, the permissions criteria, and the token to the linking database 230, which associates these data and stores them for later lookup and cross-reference.

The permission checker 240 is in communication with requesting devices 120 using the tokenized links to request documents 140, the linking database 230, and the document storage 220. When a request for the document 140 is received from a requesting device 120, the permission checker 240 extracts the token from the request and queries the linking database 230 for the identity and/or filepath of the associated document 140 and the permission criteria for the tokenized link. The permission checker 240 compares the identity information from the requesting device 120, time at which the request was received, etc., to the permission criteria to determine whether the request satisfies the permission criteria. When the request does not satisfy the permission criteria, the permission checker 240 is operable to transmit a request to the requesting device 120 to provide identifying information that will satisfy the permission criteria or a message indicating that the requesting user is not authorized to access the document 140 via the tokenized link. When the request does satisfy the permission criteria, the permission checker 240 is operable to signal the document storage 220 to retrieve the linked-to document 140 and transmit it to the authorized requesting device 120.

Figure 3:
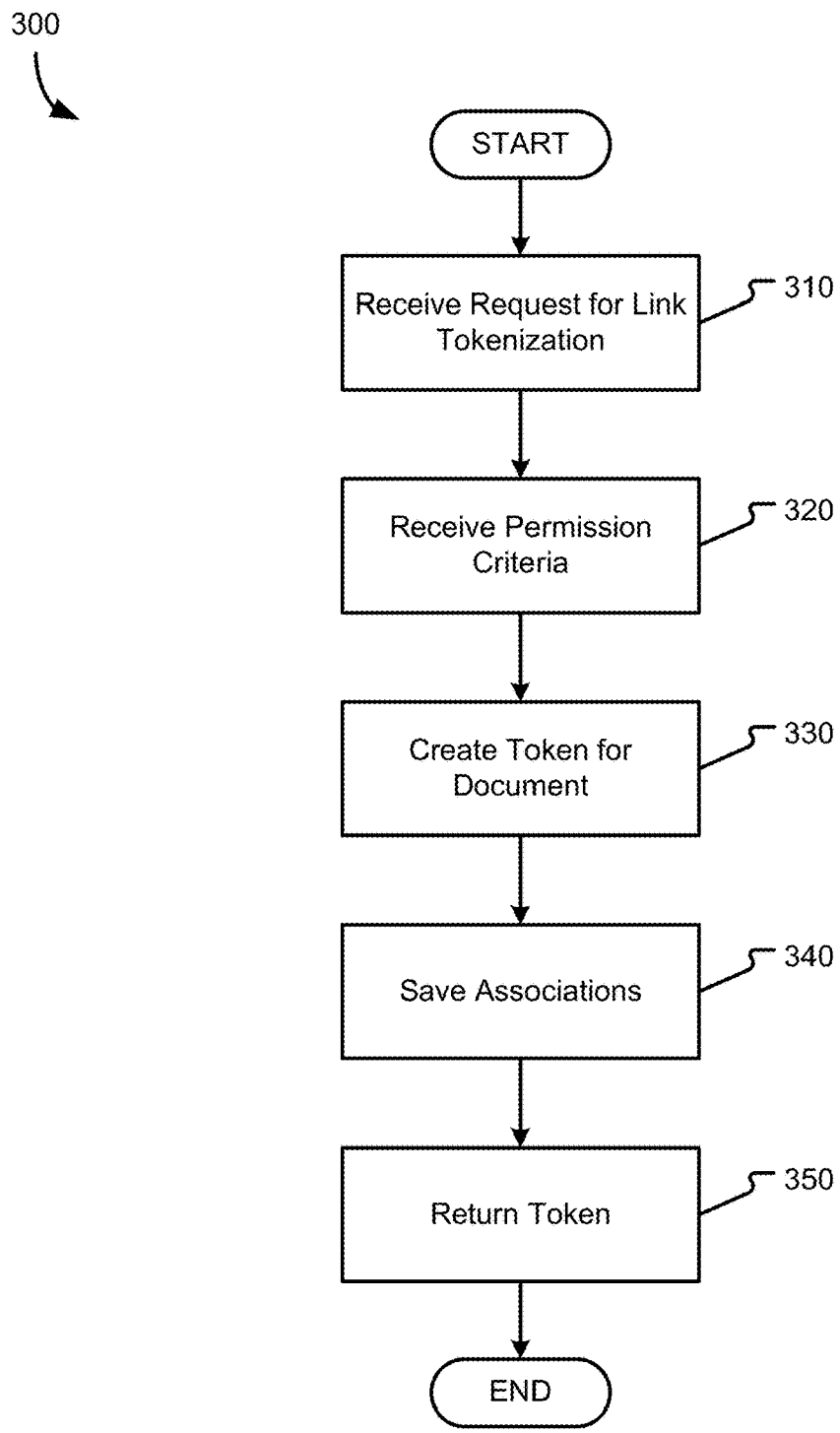
FIG. 3 is a flow chart showing general stages involved in an example method for providing a tokenized link for a document.

FIG. 3 is a flow chart showing general stages involved in an example method 300 for providing a tokenized link for a document 140. Method 300 begins when a request for link tokenization for a document 140 is received at OPERATION 310 from a distributing device 110.

The method proceeds to OPERATION 320, where the permission criteria for which users are allowed to follow the tokenized link to the document 140 are received. In various aspects, the permissions criteria are specified in conjunction with the initial request received at OPERATION 310, while in other aspects, the permissions criteria may be adjusted at a later time before or after the tokenized link has been generated. In some aspects, the permission criteria are based on the identity information for the distributing user, while in other aspects, the distributing user may specify various identity information, time windows, and access rights (e.g., read, read/write) for permission criteria. For example, the distributing user may specify that the tokenized link will only be available for a set period of time, to requesting users from a specified domain or subset of a domain (e.g., employees of Acme, Inc., employees of Acme, Inc. who are also part of the human resources department), to requesting users using permitted identity services 150 (or not using forbidden identity services 150), among other conditions. In yet other aspects, the permission criteria may be set to null, so that any user in possession of the tokenized link can access the document 140.

At OPERATION 330 a token is created for use in the tokenized link. The token is a value that is sufficiently random to prevent a user from guessing the identity of the document 140 linked to from its format, and distinct in its value from other tokens already in use. In various aspects, the token may be created based on a hashing of the filepath of the document 140 and a nonce (e.g., a timestamp) to ensure that each token generated is unique or at least statistically unlikely to be reused within a given link tokenizer 200. A hash function yields a one-way encryption of data, which may be done according to various algorithms known to those of ordinary skill in the art (SHA-2, SHA256, MD5, BLAKE2, Keccak, GOST, etc.). In other aspects, the token may be an incremented counter that is updated for each document 140 for which a tokenized link is requested.

Method 300 proceeds to OPERATION 340 where the document 140 is associated with the token, and the token is associated with the permission criteria. These associations are saved for accessing the document 140 via the tokenized link, which is discussed in greater detail in regard to FIG. 4. The associations may be stored in a database, such as the linking database 230 of the link tokenizer 200, or may be stored within a domain name server of the network environment in which the document server 130 is provided to evaluate and redirect the requests using the tokenized link to access the document 140.

At OPERATION 350 the token is returned to the distributing device 110 for incorporation into the tokenized link. In various aspects, the tokenized link points to the document server 130 or the host for the network environment in which the document server 130 is provided. The distributing device 110 may, in various aspects, include the token as part of the path of the URL (Uniform Resource Locator) for the tokenized link or include the token as a query for the URL. Method 300 then concludes.

Figure 4:
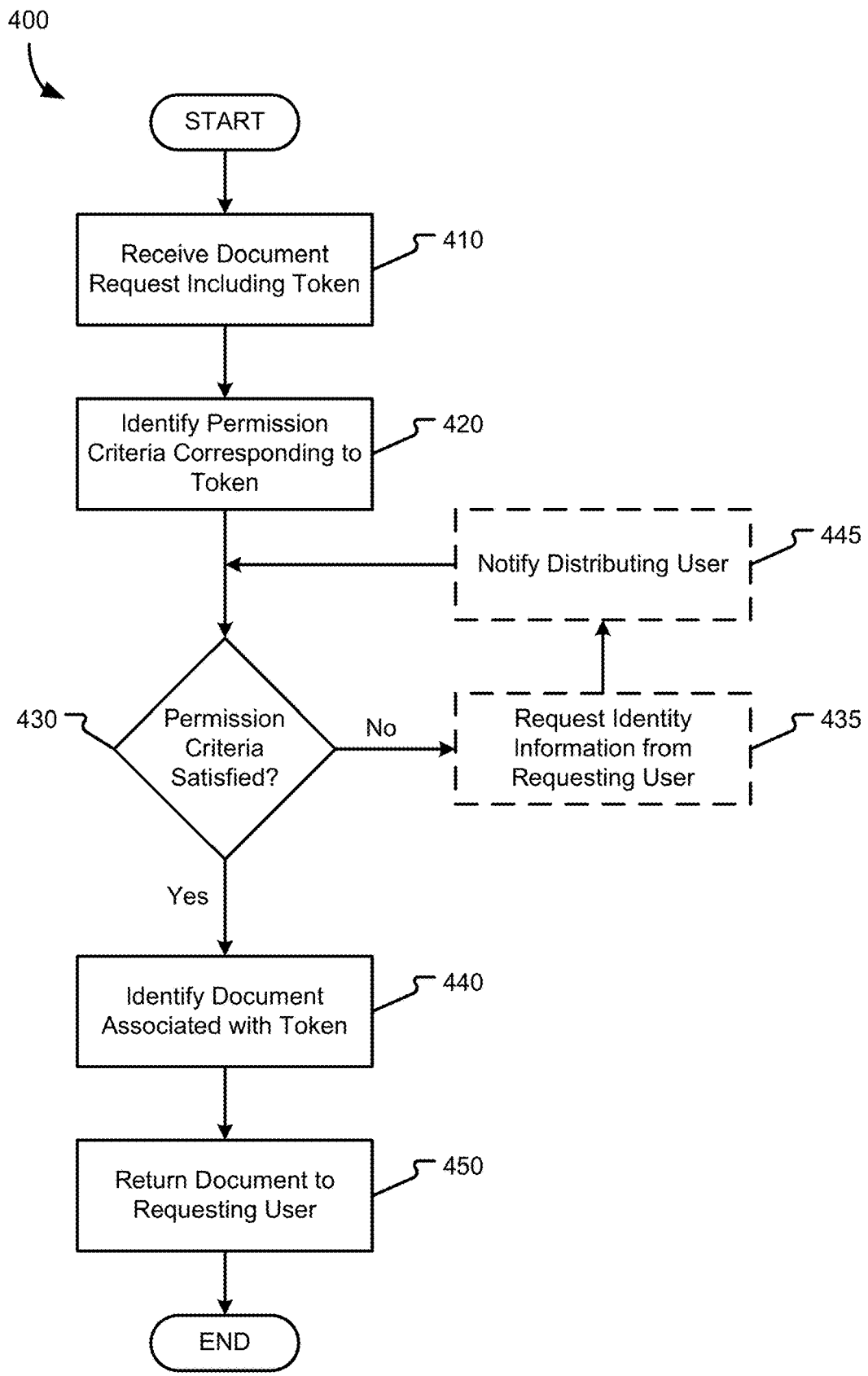
FIG. 4 is a flow chart showing general stages involved in an example method for requesting a document via a tokenized link.

FIG. 4 is a flow chart showing general stages involved in an example method 400 for requesting a document 140 via a tokenized link. Method 400 begins at OPERATION 410 in response to the document server 130 receiving a document request that uses a tokenized link, including a token for a linked-to document 140. The token is extracted from the tokenized link and used at OPERATION 420 to retrieve the permissions criteria set for sharing the document 140, and method 400 proceeds to DECISION 430. In various aspects, the token is used as a key value to retrieve the permission criteria from a linking database 230.

At DECISION 430 it is determined whether the permission criteria are satisfied. In response to determining that the permission criteria are satisfied, method 400 will proceed to OPERATION 440. In response to determining that the permission criteria are not satisfied, method 400 may optionally proceed to OPERATION 435 or OPERATION 445, or may wait until the permission criteria are satisfied.

In various aspects, the permission criteria include a time range in which the tokenized link is valid and the permission criteria will be determined to not be satisfied when the request is received outside of the specified time range. For example, a distributing user may specify that a given document 140 will be available from Tuesday until Friday, and any requesting user that uses the tokenized link before Tuesday or after Friday will be determined to not satisfy the permission criteria for the time range, whereas any requesting user that uses the tokenized link between Tuesday and Friday will be determined to satisfy the permission criteria for the time range.

When the permission criteria include a domain for which the tokenized link is valid (or invalid), the domain information of the requesting user are compared to the permission criteria. The domain information may be looked up from a domain controller and/or included in the request or when establishing the communications session between the requesting device 120 and the document server 130 (e.g., via a handshake procedure). For example, a distributing user may have specified that only users from domain X or verified by a given identity service 150 as belonging to domain X may access the document 140 via the tokenized link, and accordingly requesting users from those domains are determined to satisfy the permission criteria. In another example, a distributing user may have specified that users from domain X or verified by a given identity service 150 as belonging to domain X are forbidden from accessing the document 140 via the tokenized link, and accordingly requesting users from those forbidden domains are determined to not satisfy the permission criteria.

The permission criteria may also specify specific persons who are allowed or forbidden from using the tokenized link to access the document 140. The user identities for allowed users will therefore satisfy the permission criteria, and other user identifiers and the user identities for forbidden users will not satisfy the permission criteria. User identities may include usernames, email addresses, telephone numbers, account names/numbers, IP addresses or MAC address associated with a requesting device 120 for a requesting user, and other identifiers.

In additional aspects, the permission criteria include requirements or conditions related to the requesting device 120 that receives the document 140 from the document server 130, such as, for example: requiring the requesting device to be managed by the same Information Technology (IT) organization that manages the document server 130 or the distributing device 110, requiring the requesting device 120 to be connected to a particular network (such as the network managed by the IT organization that manages the document server 130) locally or remotely (e.g., via a Virtual Private Network), requiring that the identity of the user of the requesting device 120 match a specific list of allowed users (either as a list of individual identities, or a pre-set list (e.g., a distribution list, a directory service group, an access group for a cloud sharing platform). In further aspects, the permission criteria specify identity services 150 from which the user's identity was retrieved as either allowed or denied. For example, an IT administrator, who does not trust the security policies of a given identity service 150, sets a permission criteria that prevent users authenticated by a first identity service 150 from using the tokenized link to access the linked document 140, while allowing users authentication by a second identity service 150 to access the linked document 140 via the tokenized link.

As will be appreciated, permission criteria may combine time ranges, domains, individuals and/or device conditions for specifying when, how, and by whom a document 140 may be accessed. For example, a distributing user may specifies that John Doe and Jane Doe may each access a given document 140 before the end of the month, but only if they are authenticated by a given identity service 150 as being who they claim to be. Continuing the example, the distributing user may trust the authentication schema used by the given identity service 150 (e.g., a workplace domain controller) to be more up-to-date or secure than a different identity server 150 (e.g., a social media website's access controller).

At optional OPERATION 435 the document server 130 prompts the requesting user to supply identity information. For example, a requesting user may not be logged into any acceptable identity services 150 (according to the permission criteria), and a prompt will be transmitted to the requesting device 120 to explain to the user to log into an acceptable identity service 150 and reattempt the request via the tokenized link. In another example, a user is logged into an acceptable identity service 150, but did not supply the identity information to the document server 130, which queries the requesting device 120 for that information at optional OPERATION 435. Method 400 may return to DECISION 430 or perform optional OPERATION 445 after optional OPERATION 445.

At optional OPERATION 445 the distributing user who requested the tokenized link and set the permission criteria is contacted by the document server 130 in response to receiving a request for the linked-to document 140 that did not satisfy the permission criteria. In various aspects, the distributing user is contacted to prompt the distributing user to modify the permission criteria to allow the request. In other aspects, the distributing user is contacted to alert the distributing user to a number and/or frequency of requests for the document 140 to determine whether to take additional measures to safeguard the document 140 or to distribute the document 140 to a wider audience than the current permission criteria allow. In various aspects, the notification may indicate the user identity of the requesting user whose request did not satisfy the permission criteria, a time the request was made, and may include one or more failing document requests in a single notification. Method 400 may return to DECISION 430 or perform optional OPERATION 435 after optional OPERATION 445.

When the permission criteria are determined to have been satisfied, method 400 proceeds to OPERATION 440, where the document 140 associated with the token is identified. In various aspects, the token is used as a key value to retrieve the filepath for the document 140 from a linking database 230. Method 400 then returns the document 140 to the requesting user at OPERATION 450 by transmitting the document 140, or a portion thereof, to the requesting device 120. Method 400 then concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
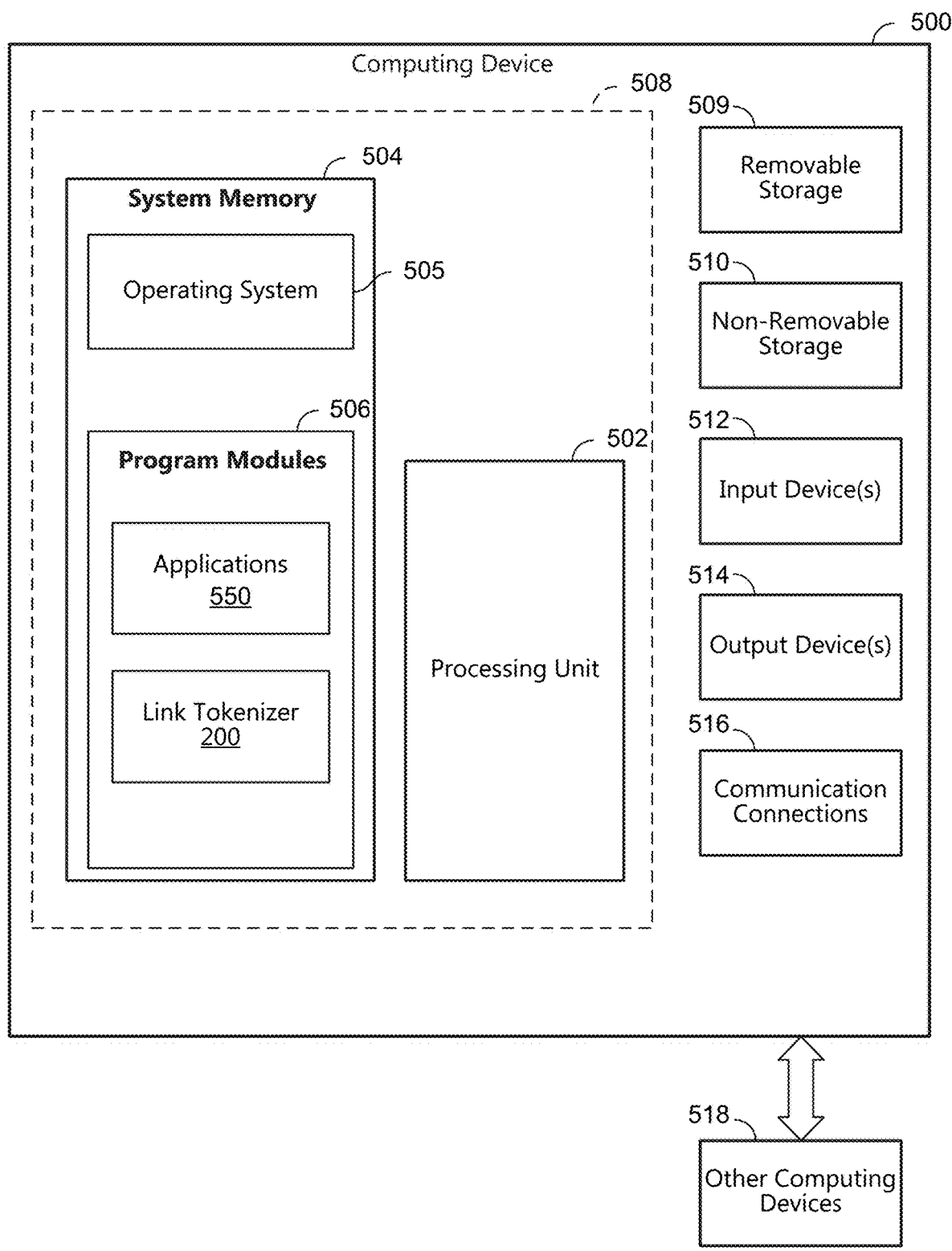
FIG. 5 is a block diagram illustrating example physical components of a computing device.
Figure 6A:
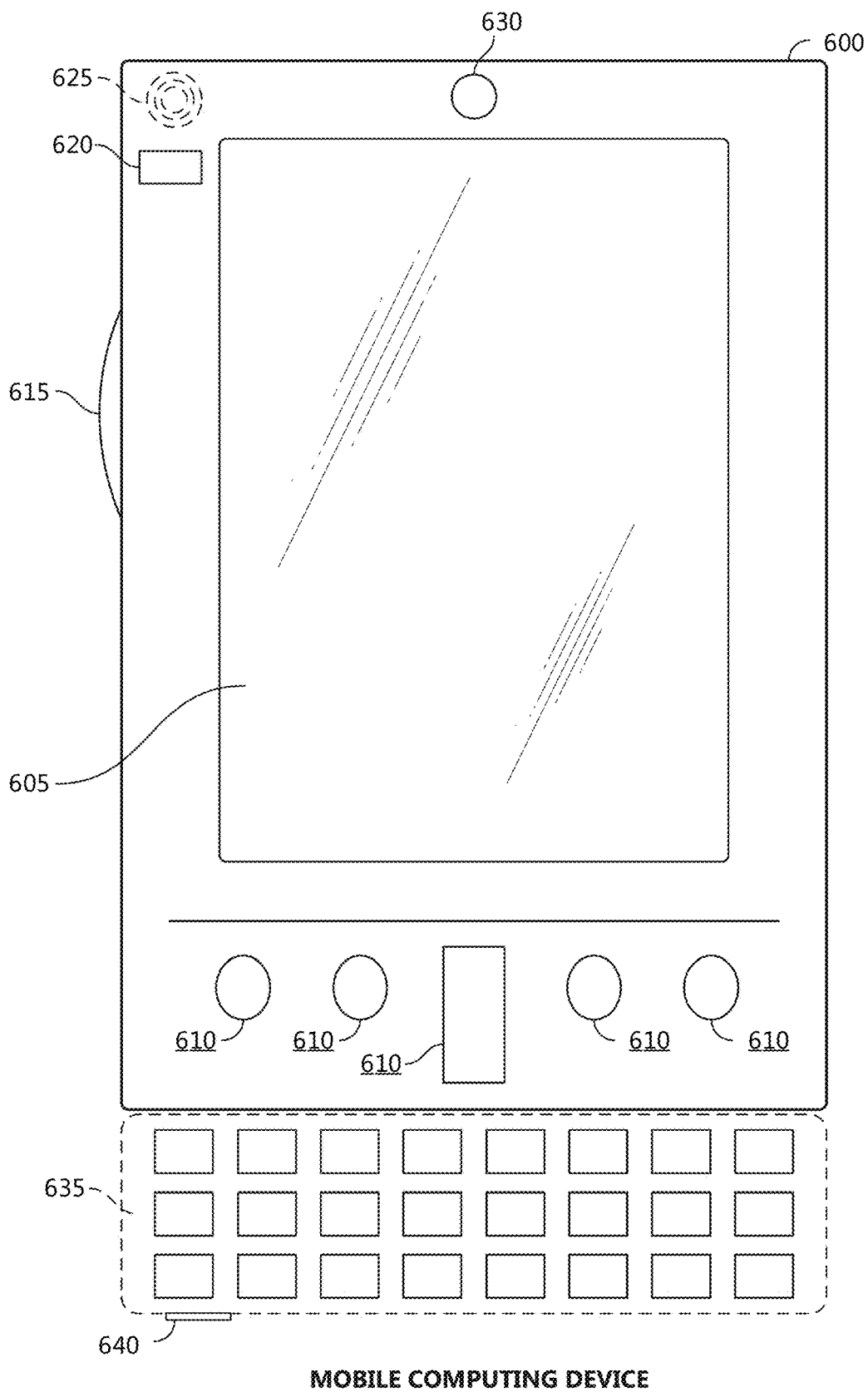
FIGS. 6A and 6B are block diagrams of a mobile computing device.
Figure 6B:
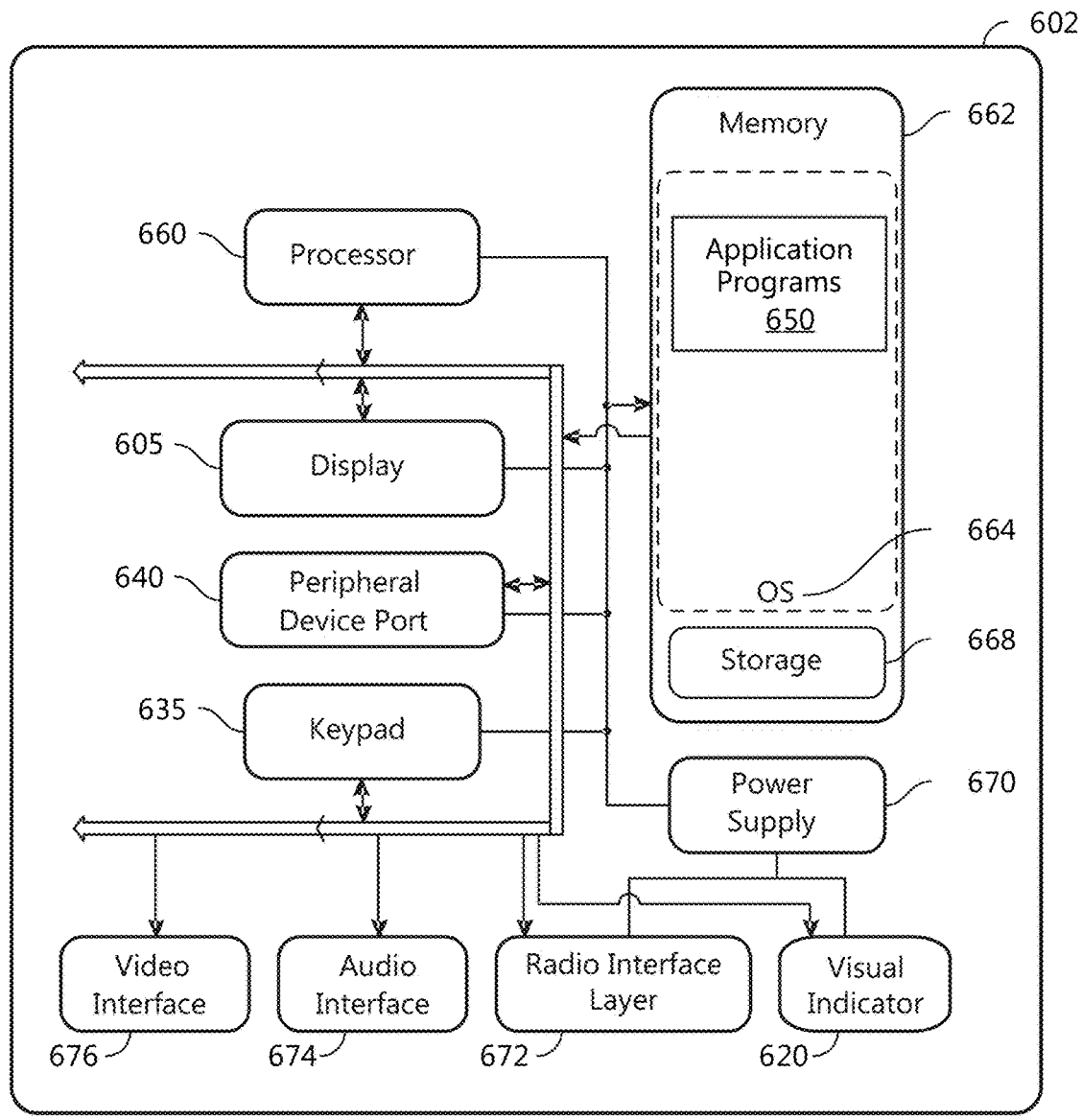
Figure 7:
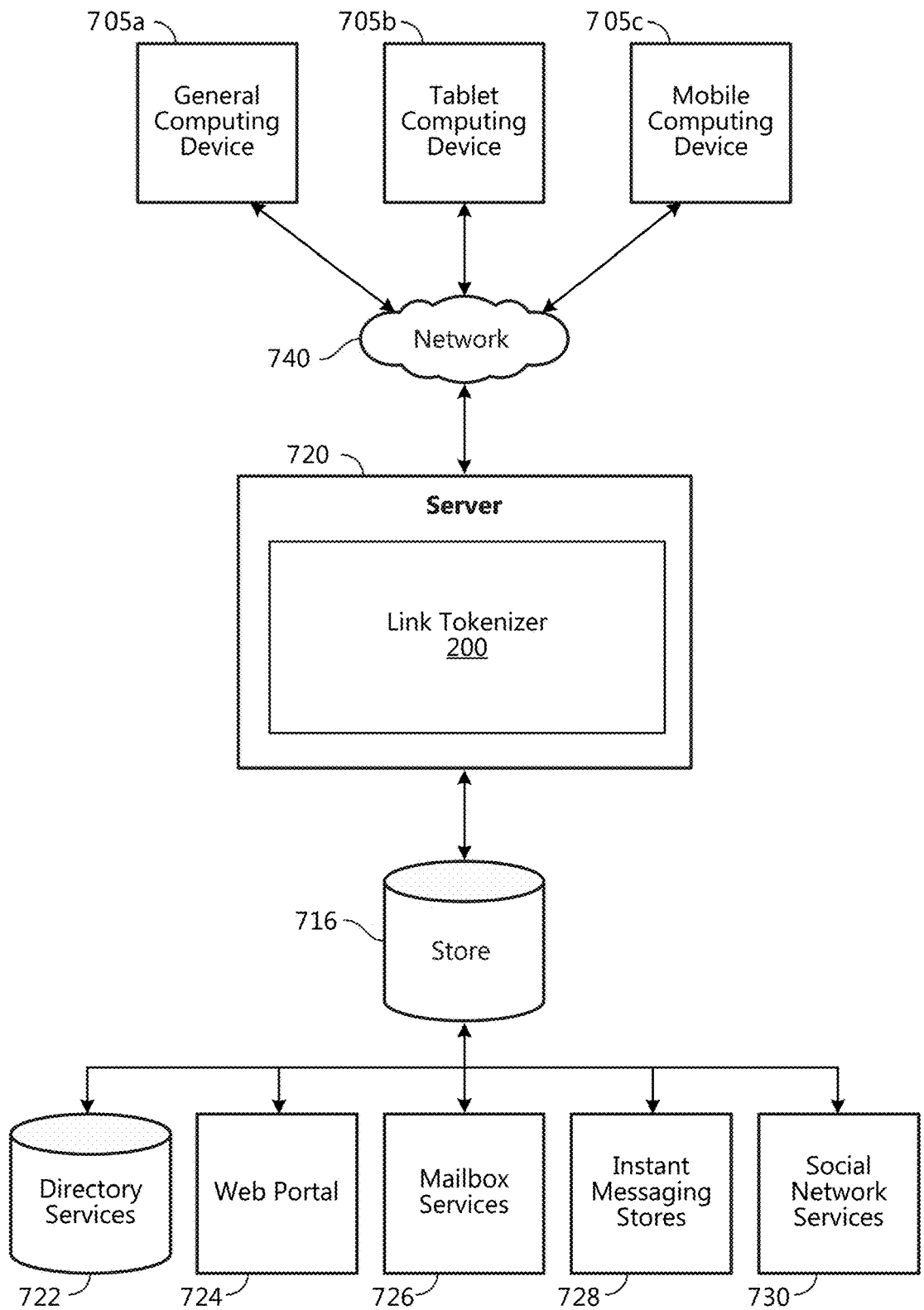
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the link tokenizer 200. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., link tokenizer 200) perform processes including, but not limited to, one or more of the stages of the methods 300 and 400 illustrated in FIGS. 3 and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for generating and handling tokenized links as described above. Content developed, interacted with, or edited in association with the link tokenizer 200 is enabled to be stored in different communication channels or other storage types. For example, various documents may be stored using a directory service 722, a web portal 724, a mailbox service 726, an instant messaging store 728, or a social networking site 730. The link tokenizer 200 is operative to use any of these types of systems or the like for generating and handling tokenized links, as described herein. According to an aspect, a server 720 provides the link tokenizer 200 to clients 705*a,b,c*. As one example, the server 720 is a web server providing the link tokenizer 200 over the web. The server 720 provides the link tokenizer 200 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method performed by a document server for sharing a document, the method comprising:
  receiving a document share request that includes permission criteria by which the document is accessible;
  creating a token comprising a random value;
  storing in a database of the document server:
    an identity of the document;
    the permission criteria;
    the token;
    a first association between the token and the identity of the document; and
    a second association between the token and the permission criteria;
  integrating the token into a link that points to the document server;
  transmitting the link to a computing device;
  receiving a document access request that includes the link from the computing device;
  extracting the token from the link;
  based on the stored second association, querying the database with the extracted token for the permission criteria;
  determining that the document access request satisfies the permission criteria;
  based on the stored first association, querying the database with the extracted token for the identity of the document; and
  transmitting the document to the computing device.

2. The method of claim 1, wherein the token is integrated into the link by the document server.

3. The method of claim 1, wherein the token is integrated into the link as a query in a Uniform Resource Locator of the link.

4. The method of claim 1, wherein the permission criteria include:
  a domain for a user to access the document;
  a time range for the user to access the document;
  an identity of the user to access the document;
  an identity server from which the user provides the identity to access the document; and
  a management organization for the document server by which the user connects the computing device to access the document.

5. The method of claim 1, wherein the link enables a second computing device to request access to the document from the document server without the document server having transmitted the link to the second computing device.

6. The method of claim 1, wherein the document is associated with a second link, the second link associated with second permission criteria.

7. The method of claim 1, wherein the document server is operable to determine whether to share the document based on whether the computing device using the link satisfies the permission criteria.

8. The method of claim 1, wherein the document server is operable to determine whether to share the document based on whether a user identity of a user making the document access request satisfies the permission criteria.

9. The method of claim 1, wherein the document server is operable to determine whether to share the document based on whether a time that the document access request was received satisfies the permission criteria.

10. A computer-implemented method performed by a document server for sharing a document, comprising:
  receiving, from a distributing device, a document share request that includes permission criteria by which the document is accessible;
  creating a token comprising a random value;
  storing in a database of the document server:
    an identity of the document;
    the permission criteria;
    a first association between the token and the identity of the document; and
    a second association between the token and the permission criteria;
  integrating the token into a link that points to the document server;
  transmitting the link to a requesting device;
  receiving, from the requesting device, a document access request including the link;
  extracting the token from the link;
  based on the stored second association, querying the database with the extracted token for the permission criteria;
  determining that the document access request satisfies the permission criteria;
  based on the stored first association, querying the database with the extracted token for the identity of the document; and
  transmitting the document to the requesting device.

11. The method of claim 10, further comprising:
  determining that the document access request does not satisfy the permission criteria; and
  transmitting a request to the requesting device for user identity information to satisfy the permission criteria.

12. The method of claim 11, wherein the request for the user identity information specifies an identity service that is operable to satisfy the permission criteria.

13. The method of claim 10, further comprising:
  determining that the document access request does not satisfy the permission criteria; and
  transmitting a notification to the requesting device that the document access request did not satisfy the permission criteria.

14. The method of claim 13, wherein the notification indicates a user identity associated with the document access request that did not satisfy the permission criteria.

15. The method of claim 10, wherein the document access request is associated with identity information for a user associated with the requesting device; and wherein determining that the document access request satisfies the permission criteria is based on the identity information for the user.

16. The method of claim 10, wherein the document access request is associated with a time at which the document access request was received by the document server; and wherein determining that the document access request satisfies the permission criteria is based on the time at which the document access request was received by the document server.

17. A system for sharing a document, comprising:

a processing unit; and a computer readable storage medium embodied as hardware, including instructions that when executed by the processing unit are operable to enable the system to:

receive, at a document server, a document share request that includes permission criteria by which the document is accessible;

create a token comprising a random value;

store in a database of the document server:

an identity of the document;

the permission criteria;

a first association between the token and the identity of the document; and a second association between the token and the permission criteria;

integrate the token into a link that points to the system;

transmit the link to a first computing device, wherein the first computing device shares the link with a second computing device;

receive a document access request that includes the link from one or more of the first computing device and the second computing device;

extract the token from the link;

based on the stored second association, query the database with the extracted token for the permission criteria;

determine that the document access request satisfies the permission criteria;

based on the stored first association query the database with the extracted token for the identity of the document; and transmit the document to the one or more of the first computing device and the second computing device.

\* \* \* \* \*